United States Patent
Kimura et al.

(10) Patent No.: US 6,805,894 B1
(45) Date of Patent: Oct. 19, 2004

(54) SOFT CANDY AND ITS PRODUCTION METHOD

(75) Inventors: Tsuguo Kimura, Yamato (JP); Yoshihiro Ohno, Tokyo (JP)

(73) Assignee: Morinaga & Co., Ltd., Tokyo (JP)

( * ) Notice: Subject to any disclaimer, the term of this patent is extended or adjusted under 35 U.S.C. 154(b) by 358 days.

(21) Appl. No.: 09/890,160

(22) PCT Filed: Jul. 31, 2000

(86) PCT No.: PCT/JP00/05139

§ 371 (c)(1),
(2), (4) Date: Jul. 27, 2001

(87) PCT Pub. No.: WO02/09530

PCT Pub. Date: Feb. 7, 2002

(51) Int. Cl.[7] .............................. A23L 1/30; A23G 3/00
(52) U.S. Cl. ..................... 426/571; 426/572; 426/659; 426/660; 426/520
(58) Field of Search ............................. 426/571, 572, 426/659, 660, 520

(56) References Cited

U.S. PATENT DOCUMENTS

| | | | | |
|---|---|---|---|---|
| 4,117,176 A | * | 9/1978 | Taylor et al. | 426/660 |
| 4,468,409 A | * | 8/1984 | Metzroth | 426/659 |
| 4,724,150 A | * | 2/1988 | Knebl et al. | 426/3 |
| 4,834,986 A | * | 5/1989 | Glass et al. | 426/3 |
| 5,236,730 A | * | 8/1993 | Yamada et al. | 426/571 |
| 5,462,760 A | | 10/1995 | Serpelloni et al. | 426/572 |
| 5,529,800 A | * | 6/1996 | Bourns et al. | 426/572 |
| 5,567,467 A | | 10/1996 | Kondou et al. | 426/659 |
| 5,580,601 A | | 12/1996 | Ribadeau-Dumas et al. | 426/660 |
| 6,180,158 B1 | * | 1/2001 | Zietlow et al. | 426/571 |
| 6,309,686 B1 | * | 10/2001 | Zietlow et al. | 426/249 |
| 6,432,460 B1 | * | 8/2002 | Zietlow et al. | 426/74 |

FOREIGN PATENT DOCUMENTS

| | | |
|---|---|---|
| EP | 0 676 147 A1 | 10/1995 |
| GB | 2 280 350 A | 2/1995 |
| JP | 61-135545 A | 6/1983 |
| JP | 63-309144 | 12/1988 |
| JP | 3-147743 | 6/1991 |
| JP | 4-084858 | 3/1992 |
| JP | 8-33451 | 2/1996 |
| KR | 9 106 095 B | 8/1991 |
| WO | WO 02/09530 A1 | 2/2002 |

OTHER PUBLICATIONS

"Food Products and Methods of Verification and Crystallization" edited by Norio Murase and Kiyotaka Sato; first printing of the first edition published by Science Forum on Jul. 4, 2000 (English translation).
Sugar Confectionery and Chocolate Manufacture, p. 196.
"Standardization of Food Texture Evaluation" edited by Tomohiko Mori and Akiko Kawabata, supervised by Japanese Society for Food Science and Technology, and published by Korin Publishing Co., Ltd. on May 12, 1997 (English translation).
"Perception and Measurement of Stickiness in Sugar–Rich Foods". Journal of Texture Studies 29 (1998), pp. 81–100.
"Gelatin—the scientific approach to product quality", Food Australia 48 (9), Sep., 1996.
HS (Japanese Industrial Standards) K6503–1996 English translation.
Takuo Watanabe, "Gaihen, [Seika Jiten]" Kabushiki Kaisha Asakura Shoten, 1981, pp. 230–238.

* cited by examiner

*Primary Examiner*—N. Bhat
(74) *Attorney, Agent, or Firm*—Nixon & Vanderhye P.C.

(57) ABSTRACT

A soft candy having superior softness when initially chewed and is resistant to adhering to the teeth and the method of preparing a soft candy is described. The soft candy comprises blending at least saccharide, vegetable oil and emulsifier, fine sucrose crystals having a crystal size of less than 30 microns which provides a confectionery product having an initial chewing ease of 5,000 to 23,000 g.s and/or teeth adherence of 100–1500 g.

28 Claims, No Drawings

SOFT CANDY AND ITS PRODUCTION METHOD

This application claims benefit under 35 U.S.C. 371 of PCT/JP00/05139 filed Jul. 31, 2000.

TECHNICAL FIELD

The present invention relates to a soft candy, and more particularly, to a soft candy and a production method for said soft candy that has superior softness when initially chewed and is resistant to adhering to the teeth.

BACKGROUND ART

Since soft candy is soft and can be chewed and swallowed even people without healthy teeth, it is popular among a wide range of age groups.

However, because soft candy is soft, it has the problem of easily adhering to the teeth. A technology that blends in an oil having a high melting point is known as an example of a means for solving this problem (Japanese Unexamined Patent Application, First Publication No. 4-84858, R. Lee and E. B. Jackson,. "Sugar Confectionery and Chocolate Manufacture", page 170, 196, and E. B. Jackson, "Sugar Confectionery Manufacture", page 127 (1990)).

However, in this technology, adhesion of soft candy to the teeth cannot be adequately prevented, and on the contrary, has the problem of the resulting soft candy being susceptible to losing its softness.

Thus, the object of the present invention is to provide a soft candy that has superior softness when initially chewed and is resistant to adhering to the teeth.

In addition, the object of the present invention is to provide a production method of said soft candy.

DISCLOSURE OF INVENTION

As a result of earnest research to solve the above problems, the inventors of the present invention found that a soft candy that is soft when initially chewed and that is resistant to adhering to the teeth is obtained by blending essential ingredients consisting of a saccharide, vegetable oil, emulsifier and fine sucrose crystals having a crystal size of less than 30 $\mu$m, and, as necessary, a frappe containing a foaming protein and saccharide, and for which softness during initial chewing (initial chewing ease) as evaluated according to a specific evaluation method to be described later, and/or resistance to adhering to the teeth (teeth adherence) as evaluated according to a specific evaluation method to be described later, are within a specific range, thereby leading to completion of the present invention.

Namely, the present invention provides a soft candy comprising blending at least a saccharide, vegetable oil, emulsifier and fine sucrose crystals having a crystal size of less than 30 $\mu$m, and having initial chewing ease of 5,000–23,000 (g.s).

In addition, the present invention provides a soft candy comprising blending at least a saccharide, vegetable oil, emulsifier and fine sucrose crystals having a crystal size of less than 30 $\mu$m, and having teeth adherence of 100–1500 (g).

In addition, the present invention provides a soft candy comprising blending at least a saccharide, vegetable oil, emulsifier and fine sucrose crystals having a crystal size of less than 30 $\mu$m, having initial chewing ease of 5,000–23,000 (g.s), and having teeth adherence of 100–1500 (g).

In addition, the present invention provides a soft candy comprising blending at least a saccharide, vegetable oil, emulsifier, fine sucrose crystals having a crystal size of less than 30 $\mu$m and a frappe containing a foaming protein and saccharide, and having initial chewing ease of 5,000–23,000 (g.s).

In addition, the present invention provides a soft candy comprising blending at least a saccharide, vegetable oil, emulsifier, fine sucrose crystals having a crystal size of less than 30 $\mu$m, and a frappe containing a foaming protein and saccharide, and having teeth adherence of 100–1500 (g).

In addition, the present invention provides a soft candy comprising blending at least a saccharide, vegetable oil, emulsifier, fine sucrose crystals having a crystal size of less than 30 $\mu$m, and a frappe containing a foaming protein and saccharide, having initial chewing ease of 5,000–23,000 (g.s), and having teeth adherence of 100–1500 (g).

In addition, the present invention provides a production method of soft candy comprising:

a first step in which a saccharide, water, vegetable oil and emulsifier are mixed and emulsified to prepare a soft candy base raw material liquid;

a second step in which said soft candy base raw material liquid is boiled down to obtain a soft candy base;

a third step in which after mixing and boiling down sucrose, saccharide other than sucrose and water, the mixture is cooled and crystals are precipitated to obtain a fine sucrose crystal composition; and, a fourth step in which said fine sucrose crystal composition obtained in the third step is added to and mixed with said soft candy base obtained in the second step to obtain a mixture.

In addition, the present invention provides a production method of soft candy comprising in addition to the above production method of soft candy:

a fifth step in which saccharide, water and foaming protein are mixed and whipped to obtain a frappe; and, a sixth step in which said frappe obtained in the fifth step is added to and mixed with said mixture obtained in the fourth step to obtain a soft candy composition.

In addition, the present invention provides a production method of soft candy comprising in addition to the above production method of soft candy:

a seventh step in which foaming protein solution is added to and mixed with said soft candy base obtained in the second step either prior or simultaneous to said fourth step.

MODES FOR CARRYING OUT THE INVENTION

Examples of saccharides used in the present invention include monosaccharides such as glucose and fructose, disaccharides such as sucrose, maltose and lactose, oligosaccharides such as starch syrup and maltodextrin, and sugar-alcohols such as sorbitol, and one type or two or more types of these saccharides can be used. Starch syrup and sucrose in particular are preferable,.

The fine sucrose crystals having a crystal size of less than 30 $\mu$m, and preferably 5–20 $\mu$m, used in the present invention (to be referred to as "fondant") can be prepared, for example, in the manner described below. Namely, sucrose, saccharide other than sucrose such as starch syrup, and water are mixed and boiled down at a temperature of preferably 100–140° C., and particularly preferably 110–130° C., until the moisture content reaches preferably 20 wt % or less, and particularly preferably 5–15 wt %. Next, the resulting product is cooled, stirred and mixed to prepare the fondant. Here, a preferable example of a saccharide other than sucrose is starch syrup. The ratio of sucrose to saccharide other than sucrose (weight ratio) is preferably 50:50–95:5, more preferably 60:40–90:10, and particularly preferably 70:30–85:15. The moisture content of the fondant is preferably 5–15 wt %, more preferably 6–14 wt %, and particularly preferably 8–12 wt %. The use of this fondant allows the obtaining of a soft candy that is soft when initially chewed, resistant to adhering to the teeth and has shape retention.

There are no particular restrictions on the melting point or other physical properties of the vegetable oil used in the present invention, and examples of vegetable oil that can be used include rape seed oil and hardened oil.

There are no particular restrictions on the emulsifier provided it is able to emulsify vegetable oil, examples of which include edible emulsifiers such as sucrose fatty acid ester, sorbitan fatty acid ester, monoglyceride, diglyceride and lecithin, and one type or two or more types of these can be used. Of these, sucrose fatty acid ester and sorbitan fatty acid ester are preferable, and the combined use of these two types is particularly preferable. In addition, although either hydrophilic or lipophilic emulsifiers maybe used, the combined use of hydrophilic and lipophilic emulsifiers is preferable. Although the use of emulsifier allows the obtaining of soft candy that is soft when initially chewed and that is resistant to adhering to the teeth, the combined use of sucrose fatty acid ester and sorbitan fatty acid ester, and moreover, the combined use of hydrophilic and lipophilic emulsifiers, makes these effects more remarkable.

There are no particular restrictions on the foaming protein used in the present invention provided it is able to contain bubbles by aeration. Although examples of foaming protein include gelatin and egg white, gelatin is particularly preferable. The particle size of said foaming protein is preferably such that 90 wt % or more passes through a 4 mesh sieve and 60 wt % or more remains on a 20 mesh sieve, and particularly preferably such that 95 wt % or more passes through a 4 mesh sieve and 80 wt % or more remains on a 20 mesh sieve, from the viewpoint of solubility in water, foaming and shape retention of the soft candy. In addition, the gel strength of said foaming protein is preferably 100–300, more preferably 150–280, and particularly preferably 180–240, in terms of the bloom value from the viewpoint of the shape retention and so forth of the soft candy.

The frappe used in the present invention can be prepared, for example, in the manner described below. Namely, after mixing a saccharide such as sucrose with starch syrup and water, and boiling down at a temperature of preferably 80–130° C., and particularly preferably 90–120° C., so that the saccharinity is preferably Bx 70–95°, and particularly preferably Bx 75–90°, the mixture is cooled to preferably 60–90° C., and particularly preferably 65–80° C. After then separately mixing a foaming protein, and preferably gelatin, with water, and subjecting to thermal decomposition preferably at 60–90° C., the resulting mixture is mixed with the above cooled saccharide liquid. The resulting mixture is then whipped so that the specific gravity is preferably 0.3–0.5, and particularly preferably 0.35–0.45, to produce the frappe used in the present invention. At this time, foaming protein is preferably swollen in water to preferably 0.5–4 times by weight, and particularly preferably 1–3 times by weight, of the mass of the foaming protein, followed by thermal decomposition. The composition of the frappe (weight ratio) is such that the ratio of saccharide: starch syrup: foaming protein: water is preferably 20–50: 20–50: 1–10: 10–30, and particularly preferably 25–45: 25–45: 2–8: 15–25. Blending of this frappe enables the obtaining of a soft candy that has a light texture, is soft when initially chewed and resistant to adhering to the teeth.

The soft candy of the present invention consists of blending essential ingredients consisting of said saccharide, vegetable oil, emulsifier and fondant, and additionally blending a frappe as necessary, and the initial chewing ease and/or teeth adherence described below are within the ranges indicated below.

Initial chewing ease expresses the hardness when the soft candy is initially chewed, and the smaller the value, the softer the soft candy when it is initially chewed. Initial chewing ease is measured according to the method described below.

Measuring instrument: Texture Analyzer TA.XT21made by Eikou Precision Instruments Co., Ltd.

Name of measurement option: Measure Force in Compression

Name of measuring probe: 10 mm DIA CYLINDER EBONITE

The above probe was inserted at a rate of 1 mm/s onto the soft candy at 20° C. to a depth of 4 mm, and the total load that was applied (area when load is plotted on the vertical axis and time is plotted on the horizontal axis: (g.s)) was taken to represent initial chewing ease.

Teeth adherence represents the resistance of soft candy to adhere to teeth immediately after initial chewing, and the smaller the value, the greater the resistance to adherence to the teeth. Teeth adherence is measured according to the method described below.

Measuring instrument: Texture Analyzer TA.XT21made by Eikou Precision Instruments Co., Ltd.

Name of measurement option: Relaxation Test

Name of measuring probe: 10 mm DIA CYLINDER EBONITE

A load of 3000 g was applied to the soft candy at 20° C. for 10 seconds, and the stress (adhesive force: (g)) when said probe was then pulled up at a rate of 3 mm/s was taken to represent teeth adherence.

Initial chewing ease as measured according to the above method is necessarily 5,000–23,000 (g.s), preferably 9,000–22,000 (g.s), more preferably 10,000–20,000 (g.s), and particularly preferably 10,000–18,000 (g.s). A soft candy having superior softness when initially chewed is obtained if the initial chewing ease is 5,000–25,000 (g.s).

Teeth adherence measured according to the above method is necessarily 100–1500 (g), preferably 200–1400 (g) and more preferably 300–1300 (g). A soft candy having superior resistance to adhering to the teeth is obtained if its teeth adherence is 100–1500 (g).

In the soft candy of the present invention, initial chewing ease of 5,000–23,000 (g.s) and teeth adherence of 100–1500 (g) are preferably, initial chewing ease of 9,000–22,000 (g.s) and teeth adherence of 100–1500 (g) are more preferable, initial chewing ease of 9,000–22,000 (g.s) and teeth adherence of 200–1400 (g) are even more preferable, initial chewing ease of 10,000–20,000 (g.s) and teeth adherence of 200–1400 (g) are particularly preferable, initial chewing ease of 10,000–20,000 (g.s) and teeth adherence of 300–1300 (g) are more particularly preferable, and initial chewing ease of 10,000–18,000 (g.s) and teeth adherence of 300–1300 (g) are most preferable. A soft candy having a particularly superior texture that is soft when initially chewed and is resistant to adhering to the teeth is obtained if initial chewing ease is 5,000–23,000 (g.s) and teeth adherence is 100–1500 (g).

Although emulsifier, frappe and fondant each have superior effects on softness when initially chewed and resistance to adherence to the teeth alone, their combined use results in even more remarkable effects. The specific gravity of the soft candy of the present invention is preferably 1.3 or less, and particularly preferably 1.25 or less, from the viewpoint of a light texture, softness when initially chewed and resistance to adhering to the teeth. In addition, the moisture content of the soft candy of the present invention is preferably 5–10 wt %, and particularly preferably 6–9 wt %, from the viewpoint of preventing adherence to the teeth and shape retention.

The production method of soft candy of the present invention is characterized by having the first to fourth steps described below. The following provides an explanation of each step.

In the first step, saccharide, water, vegetable oil and emulsifier are mixed and emulsified to prepare a soft candy base raw material liquid. The saccharide preferably includes sucrose. The emulsifier preferably uses an emulsifier described above. Mixing of each raw material can be performed using, for example, a super mixer. After mixing, the mixture is preferably heated to 70–90° C., and emulsified using, for example, a super mixer.

In the second step, the soft candy base raw material liquid obtained in the first step is boiled down to prepare a soft candy base. Although there are no particular restrictions on the apparatus for boiling down the soft candy base raw material liquid, it is preferable to boil down while reducing the pressure to prevent discoloration. In addition, the moisture content of the soft candy base after boiling down is preferably 1–10 wt %, more preferably 2–7 wt %, and particularly preferably 3–6 wt %.

In the third step, after mixing and boiling down sucrose, saccharide other than sucrose and water, the resulting mixture is cooled and crystals are precipitated to prepare a fondant. The above step can be carried out according to the previously described method.

In the fourth step, the fondant obtained in the third step is added to the soft candy base obtained in the second step and mixed to prepare a mixture. The mixing ratio of soft candy base to fondant (weight ratio) is preferably 99:1–70:30, more preferably 95:5–75:25, and particularly preferably 90:10–80:20. The temperature of the mixture is preferably held at 50–70° C. to prevent the fondant from melting. In the fourth step, it is preferable to crystallize the sucrose in the soft candybase. Sucrose can be crystallized by mixing the soft candy base and fondant for 30 seconds or more at 50–70° C.

The soft candy of the present invention is also preferably produced according to the steps described below.

In the fifth step, saccharide, water and foaming protein are mixed and whipped to prepare a frappe. The frappe can be prepared according to the previously described method.

In the sixth step, the frappe obtained in the fifth step is added to and mixed with the mixture obtained in the fourth step to prepare a soft candy composition. In this sixth step, addition of the frappe to said mixture preferably within 2 hours, and particularly preferably within 1.5 hours, after preparation is preferable from the viewpoint of reducing breakdown of the aerated gel as much as possible. At this time, since the fondant melts or the gel strength of the foaming protein decreases if the temperature after mixing exceeds 70° C., it is preferable to maintain the temperature of the soft candy composition at 50–70° C. The soft candy composition is then kneaded for 30 seconds or more at this temperature. Kneading for 30 seconds or more improves crystallization of the fondant and the effect of dispersing the fondant in the soft candy base. In addition, the specific gravity of the soft candy composition obtained in the sixth step is preferably less than 1.3, and particularly preferably less than 1.25, from the viewpoint of a light texture.

In the present invention, a foaming protein solution can be added and mixed into the soft candy base obtained in the second step before or simultaneous to the fourth step (seventh step). This allows the hardness and texture, etc. or the soft candy to be adjusted. After going through the seventh step, it is preferable to maintain the temperature of the mixture of soft candy base, fondant, foaming protein solution and frappe at 50–70° C. Doing so prevents the fondant from melting while also preventing the gel strength of the foaming protein from decreasing.

Moreover, colorant, sour flavoring, fragrance, fruit juice and so forth are added in the present invention as necessary.

Although soft candy can be produced according to the above method, in the present invention, by going through a molding step and a strain reduction step which reduces strain by rolling the resulting molded product as necessary, a soft candy can be produced having higher product value. In addition, said soft candy may later be suitably packaged.

Soft candy having different colors and flavors can be produced, and that candy can be made to have multiple layers by using the production method of soft candy of the present invention. Moreover, the form of the soft candy can be made to be such that one type of soft candy is wrapped with another soft candy of a different color and flavor.

EXAMPLES

Although the following provides a more detailed explanation of the present invention by indicating examples, the present invention is not limited to the following examples.

Example 1

(1) Preparation of Soft Candy Base Raw Material Liquid 50 parts by weight of sucrose, 50 parts by weight of starch syrup, 10 parts by weight of water, 0.15 parts by weight of sorbitan fatty acid ester and 0.15 parts by weight of HLB11 sucrose fatty acid ester were mixed in a super mixer followed by heating to 80° C. while stirring. Next, 10 parts by weight of rape seed oil were mixed in followed by emulsifying while stirring to obtain a soft candy base raw material liquid.

(2) Preparation of Soft Candy Base

After boiling down the soft candy base raw material liquid obtained in (1) using a super film cooker (Sakuma Seisakusho Ltd.) at a vacuum of 600 mmHg and temperature of 118° C. until the moisture content reached about 5 wt %, the product was cooled to 70° C. to obtain a soft candy base.

(3) Preparation of Fondant 70 parts by weight of sucrose, 30 parts by weight of starch syrup and 20 parts by weight of water were mixed in a melting tank and boiled down at 121° C. until the moisture content reached 10 wt %. Next, this was cooled to 70° C. to obtain a fondant having a particle size of 30 μm or less.

(4) Preparation of Frappe

After mixing 75 parts by weight of sucrose, 75 parts by weight of starch syrup and 25 parts by weight of water and boiling down at 118° C. until the saccharinity reached Bx 90°, the mixture was cooled to 70° C. Separate from this, after dissolving 10 parts by weight of gelatin (gel strength: 200 bloom, particle size: 100% passes through a 4 mesh sieve, 90% remains on a 20 mesh sieve) in twice as many parts by weight of water at 80° C. and debubbling, the solution was cooled to 70° C. (gelatin solution) Next, both were mixed at a ratio of 8:1 (weight ratio) to obtain a frappe. The saccharinity of said frappe was Bx 80°.

(5) Mixing of Soft Candy Base, Fondart, Frappe, etc.

80 parts by weight of soft candy base, 20 parts by weight of fondant and 1 part by weight of gelatin solution prepared in (4) were mixed and kneaded for 30 seconds or more. The temperature after kneading was 70° C. Next, sour flavoring, fruit juice, fragrance and colorant were added followed by the addition of the frappe and kneading for 30 seconds or more. The temperature after stirring was 65° C. Next, this was cooled to 45° C. to obtain a soft candy composition.

(6) Production of Soft Candy

The soft candy composition obtained in the above manner was molded and rolled to reduce strain to produce soft candy (1).

In addition, a soft candy composition having a different color and flavor than the soft candy composition obtained above was separately prepared according to the same method as described above, wrapped with the soft candy composition obtained above, molded and rolled to reduce strain to produce soft candy (2).

Test Example 1
Evaluation of Softness during Initial Chewing and Resistance to Adhering to Teeth The initial chewing ease and teeth adherence of soft candy (1) obtained in the manner described above and commercial products A, B and C were evaluated according to the measurement methods previously described. In addition, sensory evaluations were performed by 10 panelists on the softness during initial chewing and resistance to adhering to the teeth for soft candy (1) and commercial products A, B and C. Those results are shown in Table 1. In addition, overall evaluations of softness during initial chewing and resistance to adhering to the teeth of each product are shown in Table 2.

TABLE 1

| | Initial chewing ease | | Teeth adherence | |
|---|---|---|---|---|
| | Total load (g's) | Sensory evaluation | Max. load (g) | Sensory evaluation |
| Soft Candy (1) | 10,000–18,000 | ◯ | 500–1,300 | ◯ |
| Product A | 23,000–30,000 | Δ | Greater than 1500 | X |
| Product B | 23,000–30,000 | Δ | 500–1,500 | Δ |
| Product C | Greater than 30,000 | X | Less than 500 | ◯ |

(◯: Soft or does not adhere to teeth, Δ: Neither, X: Hard or adheres to teeth)

TABLE 2

| | Initial chewing ease | Teeth adherence |
|---|---|---|
| Soft candy (1) | ◯ | ◯ |
| Product A | Δ | X |
| Product B | Δ | Δ |
| Product C | X | ◯ |

(◯: Soft or does not adhere to teeth, Δ: Neither, X: Hard or adheres to teeth)

The initial chewing ease and teeth adherence as determined according to the previously described measurement methods demonstrated an extremely high correlation with the sensory evaluations, clearly indicating that the above measurement methods are effective methods for evaluating soft candy.

Soft candy (1) is extremely soft when initially chewed, has favorable teeth adherence, and is clearly a soft candy having an superior texture. In contrast, the initial chewing ease and/or teeth adherence of the commercial products were not adequate, and were inferior to the soft candy of the present invention.

INDUSTRIAL APPLICABILITY

The soft candy of the present invention is soft when initially chewed, is resistant to adhering to the teeth, has superior texture and flavor, and has high value as soft candy.

In addition, the production method of soft candy of the present invention is an effective method for producing said soft candy.

What is claimed is:

1. A soft candy comprising blending at least a saccharide, vegetable oil, emulsifier and fine sucrose crystals having a crystal size of less than 30 μm, and having initial chewing ease of 5,000–23,000 (g.s).

2. A soft candy comprising blending at least a saccharide, vegetable oil, emulsifier and fine sucrose crystals having a crystal size of less than 30 μm, and having teeth adherence of 100–1500 (g).

3. A soft candy comprising blending at least a saccharide, vegetable oil, emulsifier and fine sucrose crystals having a crystal size of less than 30 μm, having initial chewing ease of 5,000–23,000 (g.s), and having teeth adherence of 100–1500 (g).

4. A soft candy comprising blending at least a saccharide, vegetable oil, emulsifier, fine sucrose crystals having a crystal size of less than 30 μm and a frappe containing a foaming protein and saccharide, and having initial chewing ease of 5,000–23,000 (g.s).

5. A soft candy comprising blending at least a saccharide, vegetable oil, emulsifier, fine sucrose crystals having a crystal size of less than 30 μm, and a frappe containing a foaming protein and saccharide, and having teeth adherence of 100–1500 (g).

6. A soft candy comprising blending at least a saccharide, vegetable oil, emulsifier, fine sucrose crystals having a crystal size of 30 μm or less, and a frappe containing a foaming protein and saccharide, having initial chewing ease of 5,000–23,000 (g.s), and having teeth adherence of 100–1500 (g).

7. A soft candy according to claim 1 wherein, the specific gravity of the finished product is less than 1.3.

8. A soft candy according to claim 1 wherein, said emulsifier is sucrose fatty acid ester and/or sorbitan fatty acid ester.

9. A soft candy according to claim 1 wherein, moisture content is 5–10 wt %.

10. A production method of soft candy comprising:

a first step in which a saccharide, water, vegetable oil and emulsifier are mixed and emulsified to prepare a soft candy base raw material liquid;

a second step in which said soft candy base raw material liquid is boiled down to obtain a soft candy base;

a third step in which after mixing and boiling down sucrose, saccharide other than sucrose and water, the mixture is cooled and crystals are precipitated to obtain a fine sucrose crystal composition having a crystal size of less than 30 μm; and, a fourth step in which said fine sucrose crystal composition having a crystal size of less than 30 μm obtained in said third step is added to and mixed with said soft candy base obtained in said second step to obtain a mixture.

11. A production method of soft candy according to claim 10 wherein, in said first step, sucrose fatty acid ester and/or sorbitan fatty acid ester is used as said emulsifier.

12. A production method of soft candy according to claim 10 wherein, the moisture content of the soft candy base obtained in said second step is 1–10 wt %.

13. A production method of soft candy according to claim 10 wherein, in said third step, the ratio of sucrose to other saccharide is 60:40–95:5 in terms of weight ratio.

14. A production method of soft candy according to claim 10 wherein, in said fourth step, 5–30 parts by weight of fine sucrose crystal composition having a crystal size of less than 30 μm are added to 95–70 parts by weight of said boiled down soft candy base.

15. A production method of soft candy according to claim 10 wherein, in said fourth step, the temperature of the mixture of said boiled down soft candy base and said fine sucrose crystal composition having a crystal size of less than 30 μm is maintained at 50–70° C.

16. A production method of soft candy according to claim 10 wherein, sucrose is blended as one saccharide in said first step, and sucrose in said soft candy base is crystallized in said fourth step.

17. A production method of soft candy according to claim 10 additionally comprising:

a fifth step in which saccharide, water and foaming protein are mixed and whipped to obtain a frappe; and, a sixth step in which said frappe obtained in said fifth step is added to and mixed with said mixture obtained in said fourth step to obtain a soft candy composition.

18. A production method of soft candy according to claim 17 wherein, in said fifth step, a foaming protein having a particle size such that 90 wt % or more passes through a 4 mesh sieve and 60 wt % or more remains on a 20 mesh sieve is used for said foaming protein.

19. A production method of soft candy according to claim 17 wherein, in said fifth step, a foaming protein having gel strength of 100–300 is used for said foaming protein.

20. A production method of soft candy according to claim 17 wherein, said foaming protein is gelatin.

21. A production method of soft candy according to claim 17 wherein, in said fifth step, the weight ratio of said frappe is 0.3–0.5.

22. A production method of soft candy according to claim 17 wherein, in said fifth step, the composition (weight ratio) of frappe is 20–50 parts sucrose, 20–50 parts starch syrup, 1–10 parts foaming protein and 10–30 parts water.

23. A production method of soft candy according to claim 17 wherein, in said sixth step, frappe is added within 2 hours after production.

24. A production method of soft candy according to claim 17 wherein, in said sixth step, the specific gravity of the resulting soft candy composition is less than 1.3.

25. A production method of soft candy according to claim 17 wherein, the temperature of said soft candy composition is maintained at 50–70° C.

26. A production method of soft candy according to claim 17 wherein, foaming protein solution is added and mixed with the soft candy base obtained in said second step before or simultaneous to said fourth step.

27. A production method of soft candy according to claim 26, wherein, the temperature of the mixture of said soft candy base, said fine sucrose crystals having a crystal size of less than 30 μm, said foaming protein solution and said frappe is maintained at 50–70° C.

28. A production method soft candy according to claim 10 having a molding step and a strain reduction step which reduces strain by rolling the resulting molded product.

* * * * *

UNITED STATES PATENT AND TRADEMARK OFFICE
CERTIFICATE OF CORRECTION

PATENT NO. : 6,805,894 B1
APPLICATION NO. : 09/890160
DATED : October 19, 2004
INVENTOR(S) : Kimura et al.

It is certified that error appears in the above-identified patent and that said Letters Patent is hereby corrected as shown below:

Column 8, lines 34-62 - Replace Claims 1-6 with

1. A soft candy comprising blending at least a saccharide, vegetable oil, emulsifier and fine sucrose crystals having a crystal size of less than 30 μm, wherein the compounding ratio of fine sucrose crystals to the soft candy is 1 to 30% by mass, and having initial chewing ease of 5,000-23,000 (g·s).

2. A soft candy comprising blending at least a saccharide, vegetable oil, emulsifier and fine sucrose crystals having a crystal size of less than 30 μm, wherein the compounding ratio of fine sucrose crystals to the soft candy is 1 to 30% by mass, and having teeth adherence of 100-1500 (g).

3. A soft candy comprising blending at least a saccharide, vegetable oil, emulsifier and fine sucrose crystals having a crystal size of less than 30 μm, wherein the compounding ratio of fine sucrose crystals to the soft candy is 1 to 30% by mass, having initial chewing ease of 5,000-23,000 (g·s), and having teeth adherence of 100-1500 (g).

4. A soft candy comprising blending at least a saccharide, vegetable oil, emulsifier, fine sucrose crystals having a crystal size of less than 30 μm, wherein the compounding ratio of fine sucrose crystals to the soft candy is 1 to 30% by mass, and a frappe containing a foaming protein and saccharide, and having initial chewing ease of 5,000-23,000 (g·s).

5. A soft candy comprising blending at least a saccharide, vegetable oil, emulsifier, fine sucrose crystals having a crystal size of less than 30 μm, wherein the compounding ratio of fine sucrose crystals to the soft candy is 1 to 30% by mass, and a frappe containing a foaming protein and saccharide, and having teeth adherence of 100-1500 (g).

UNITED STATES PATENT AND TRADEMARK OFFICE
CERTIFICATE OF CORRECTION

PATENT NO.        : 6,805,894 B1
APPLICATION NO. : 09/890160
DATED             : October 19, 2004
INVENTOR(S)       : Kimura et al.

It is certified that error appears in the above-identified patent and that said Letters Patent is hereby corrected as shown below:

Column 8, lines 34-62 - Replace Claims 1-6 with (cont'd)
     6. A soft candy comprising blending at least a saccharide, vegetable oil, emulsifier, fine sucrose crystals having a crystal size of 30 μm or less, wherein the compounding ratio of fine sucrose crystals to the soft candy is 1 to 30% by mass, and a frappe containing a foaming protein and saccharide, having initial chewing ease of 5,000-23,000 (g·s), and having teeth adherence of 100-1500 (g).

Signed and Sealed this

Third Day of April, 2007

JON W. DUDAS
*Director of the United States Patent and Trademark Office*